United States Patent [19]

Kambe et al.

[11] Patent Number: 4,970,384
[45] Date of Patent: Nov. 13, 1990

[54] OPTICAL SENSOR FOR DETECTING DISTANCE TO AN OBJECT INCLUDING ANAMORPHIC LIGHT RECEIVING LENS

[75] Inventors: Yoshiaki Kambe; Yoshihiko Okuda; Atsuyuki Hirono; Akira Nagaoka; Takayasu Ito, all of Kadoma, Japan

[73] Assignee: Matsushita Electric Works, Ltd., Osaka, Japan

[21] Appl. No.: 391,246

[22] Filed: Aug. 9, 1989

Related U.S. Application Data

[62] Division of Ser. No. 150,385, Jan. 29, 1988, Pat. No. 4,876,446.

[30] Foreign Application Priority Data

Feb. 6, 1987 [JP] Japan .................. 62-26755
Feb. 24, 1987 [JP] Japan .................. 62-41006
Jul. 15, 1987 [JP] Japan .................. 62-176256

[51] Int. Cl.$^5$ .................. G01J 1/20; G01V 9/04; G01C 3/00
[52] U.S. Cl. .................. 250/221; 250/201.6; 356/1
[58] Field of Search .......... 250/560, 561, 201, 211 K, 250/221, 201.4, 201.5, 201.6; 356/1, 4, 375; 354/403

[56] References Cited

U.S. PATENT DOCUMENTS

| | | | |
|---|---|---|---|
| 3,679,307 | 7/1972 | Zoot et al. ................. | 356/1 |
| 4,313,654 | 2/1982 | Matsui et al. .............. | 356/1 |
| 4,477,168 | 10/1984 | Hosoe ....................... | 356/1 |
| 4,595,271 | 6/1986 | Suda et al. ................. | 250/201 |
| 4,660,969 | 4/1987 | Sorimachi et al. .......... | 356/376 |
| 4,675,517 | 6/1987 | Shiomi ...................... | 250/201 |
| 4,694,149 | 9/1987 | Toyama et al. ............. | 356/4 |

Primary Examiner—David C. Nelms
Assistant Examiner—Michael Messinger
Attorney, Agent, or Firm—Burns, Doane, Swecker & Mathis

[57] ABSTRACT

An optical sensor discriminating the presence of an object or detecting distance to an object which includes a light projecting element for projecting light to a detection area, a light receiving element for receiving light reflected from an object present in the detection area and an anamorphic light receiving lens for expanding a condensed light spot received on the light receiving element in a direction perpendicular to a direction of movement of the light spot on the light receiving element. The light receiving element outputs a detection signal which discriminates the presence of the object in the detection area. The light receiving element can be rectangular in shape and comprise two or more triangular shaped photodiodes which output detection signals that can be processed to determine a distance between the object and the light receiving element. A movable prism can also be provided to compensate for movement of the object other than towards or away from the light receiving element to avoid erroneous distance measurement which might otherwise occur.

12 Claims, 8 Drawing Sheets

OPTICAL SENSOR FOR DETECTING DISTANCE TO AN OBJECT INCLUDING ANAMORPHIC LIGHT RECEIVING LENS

This application is a divisional, of application Ser. No. 07/150,385, filed Jan. 29, 1988 now U.S. Pat. No. 4,876,446.

FIELD OF THE INVENTION

This invention relates to optical sensors having a sensor circuit with parts there of interconnected through an optical interconnection system.

The optical sensors of the kind referred to should have enhanced utility when employed for detecting an object present within a detection area.

DESCRIPTION OF PRIOR ART

The use of optical interconnection between respective sensor circuit parts with an optical interconnection system utilized has been discussed by J. A. Neff in his article titled "Optical Interconnections Between Integrated Circuit Chips" in "Hybrid Circuits" No. 10, May 1986, pages 68-71, in which the circuit chips are interconnected through optical fibers, instead of by conventional conductor connection employing conductor foils and the like.

While in this case the technique of optical fiber connection of Neff may be one of basic technologies for the optical interconnection system, there still has been suggested no practical measure that can be employed on a commercial scale in, for example, required interconnection arrangement for the optical sensors and the like. Accordingly, there is a need for an optical interconnection system which can be produced at a low cost.

SUMMARY OF THE INVENTION

A primary object of the present invention is, therefore, to provide an optical sensor in which the optical interconnection arrangement is utilized for simpler interconnections between the respective sensor circuit parts, so that the mass-producibility of the sensor can be increased to lower its manufacturing costs.

According to the present invention, the above object can be attained by providing an optical sensor in which light is projected from a light projecting means through a sensor function setting section to a detecting area, a reflected light from an object within the detecting area is received by a light receiving means, and the presence or absence of the object is discriminated at a signal processing means by operating outputs from the light receiving means, the signal processing means providing an object detection signal, wherein the light projecting means, light receiving means and signal processing means are optically interconnected through an optical interconnection board.

In the optical sensor of the above arrangement according to the present invention, respective parts of sensor circuit can be interconnected by the optical interconnection board in a simpler manner, whereby required electric connection between the respective circuit parts can be remarkably simplified, the sensor can be remarkably improved in its producibility, and it is made possible to realize the mass-producibility of the sensor and thus at a lower cost.

Other objects and advantages of the present invention will be made clear in following description of the invention with reference to embodiments shown in accompanying drawings.

BRIEF DESCRIPTION OF THE DRAWINGS

FIGS. 19(i), 19(j), 19(k), and 19(l) show another embodiment of the optical sensor according to the present invention, in which

DETAILED DESCRIPTION OF THE PREFERRED EMBODIMENTS

Figures 1, 2, 4, 5, 6, 7:
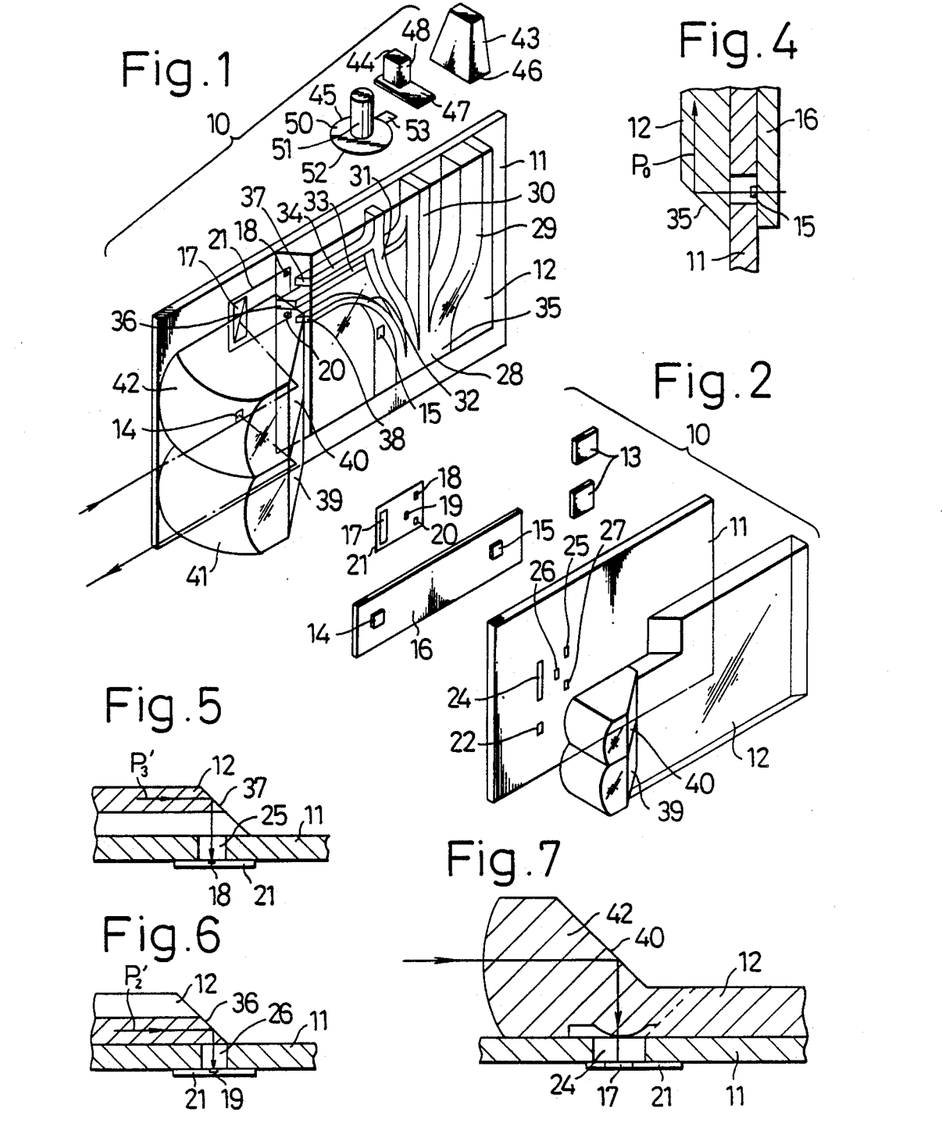
FIG. 1 is a perspective view of the optical sensor according to the present invention in an embodiment thereof, with a portion shown as disassembled.
FIG. 2 is a perspective view as disassembled of the optical sensor shown in FIG. 1 in a slightly reduced scale.
FIGS. 4, 5, 6, and 7 are fragmentary sectioned views for showing a relationship between an optical interconnection board and a printed circuit substrate in the optical sensor of FIG. 1 at their different positions.
Figure 3:
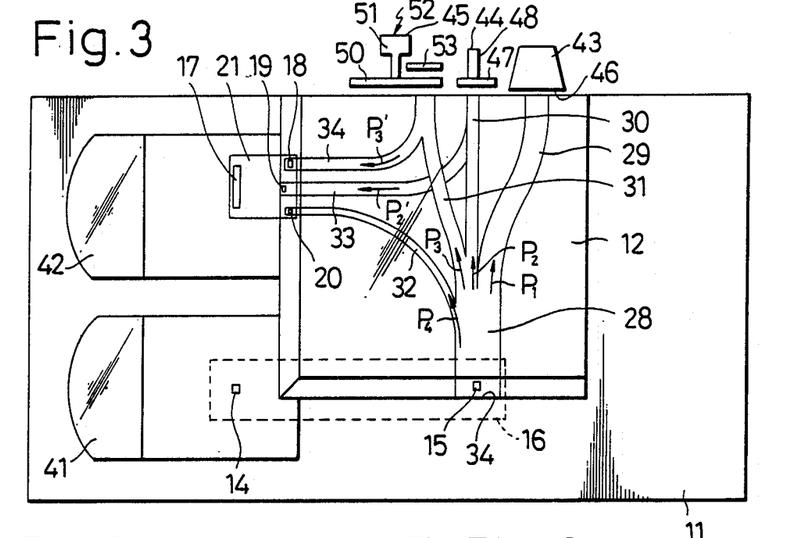
FIG. 3 is a side view of the optical sensor of FIG. 1 in a slightly enlarged scale.

Referring here to FIGS. 1 to 3, there is shown as an embodiment according to the present invention a reflection type optical sensor 10, which comprises a printed circuit substrate 11 carrying on one side light projecting and receiving elements and on the other side an optical interconnection board 12. The printed circuit substrate 11 comprises preferably such an electrically insulative substrate as a ceramic, glass or the like plate and a conductor circuit pattern formed on a surface of the substrate, and such electronic circuit parts 13 as chips including, for example, transistors, capacitors, resistors and the like are mounted onto the conductor pattern. A light emitting element 14 such as a light emitting diode which forms a light projecting means as well as an operation indicating light emitting element 15 which also functions as a reference light generator are mounted to an auxiliary printed circuit substrate 16 which is mounted to the printed circuit substrate 11. A first light receiving element 17 and a second group of light receiving elements 18-20 which are forming a light receiving means for the reflection light from any object present in the detecting area are made into one IC chip 21, and this IC 21 is also mounted to the printed circuit substrate 11.

In the present instance, the printed circuit substrate 11 is made to have through holes 22-27 at positions corresponding to the light emitting elements 14 and 15 as well as to the light receiving elements 17 and 18-20 on the one side of the substrate 11 so that these light emitting and receiving elements and electronic circuit parts can be optically interconnected through these through holes 22-27 with the optical interconnection board 12, while these holes function also as positioning means for mounting the former elements and parts to the substrate 11. In an event where the printed circuit substrate 11 is made of a transparent material of a low light attenuation such as a transparent ceramic, transparent glass or the like, it is not always necessary to the through holes in the substrate.

The optical wiring board 12 comprises, on the other hand, optical wave guides 28-34, input and output mirror portions 35-40, light projecting lens portion 41 and light receiving lens portion 42. In this case, the optical wiring board 12 may be mass-produced and thus made at a lower cost with employment of any precision resin molding technique or integrated circuit formation technique based on a photographic masking operation which is well known to one skilled in the art. In forming the wiring board 12, a photo-setting resin is preferably employed so that the optical wave guides 28-33 can be effectively prepared by means of patterning with a photographic masking exposure. It is also possible to employ a glass plate as the basic member for the optical wiring board 12 in which the optical wave guides 28-34 can be formed with a material of a high refractive index diffused into the glass at predetermined portions of the glass plate, or with any proper manner of preparation of the optical wave guide other than the above as occasion demands. At end portions of the optical wave guides 29-31 branching off from the guide 28, there is disposed a sensor function operating section comprising an operation indicating member 43, output mode setting member 44 and sensitivity setting member 45, in proximity to the end portions.

In the optical wiring board 12 as in the above, a light $P_0$ emitted from the light emitting element 15 is provided as an input to the optical wave guide 28 through the input mirror portion 35 as seen in FIG. 4, and the light $P_0$ is divided at a predetermined ratio to the respective optical wave guides 29-32 to propagate therethrough, as shown in FIG. 3. First branch light $P_1$ in the wave guide 29 is directed to a light input surface 46 of the operation indicating member 43 of a light diffusion block type at the end portion of the guide 29, the light thus reaching the member 43 being caused to be scattered in all radial directions so that it can be visually determined that the optical sensor 10 is in an operating state. Second branch light $P_2$ is directed to the output mode setting member 44 disposed at the end portion of the optical wave guide 30. This output mode setting member 44 comprises a shiftable flat plate part 47 and an operating part 48 secured onto the flat part 47, and this flat plate part 47 is formed so as to be non-reflective only at a part of a surface of the plate part 47 facing the end portion of the wave guide 30 while the rest of the surface of the plate part is formed so as to be reflective, so that the reflection factor at the output mode setting member 44 can be varied by having the member 44 slid to displace the non-reflective surface part with respect to the opposing end portion of the wave guide 30, whereby the branch light $P_2$ is modified in response to the amount of displacement of the output mode setting member 44. An optical wave guide 33 is provided with one end thereof opposed to the setting member 44 so as to be jointly disposed with the branch wave guide 30 in the thickness direction of the wiring board 12 and the other end thereof extends away therefrom, as seen best in FIG. 1, to a sideward direction so as to terminate at a mirror portion 36. Accordingly a modulated light $P_2'$ responsive to the set position of the setting member 44 is directed through the wave guide 33, the modified light being reflected at the mirror portion 36 and received by the light receiving element 19 opposing the other end of the wave guide 33, as seen best in FIG. 6.

Figures 8, 9, 10, 11, 16:
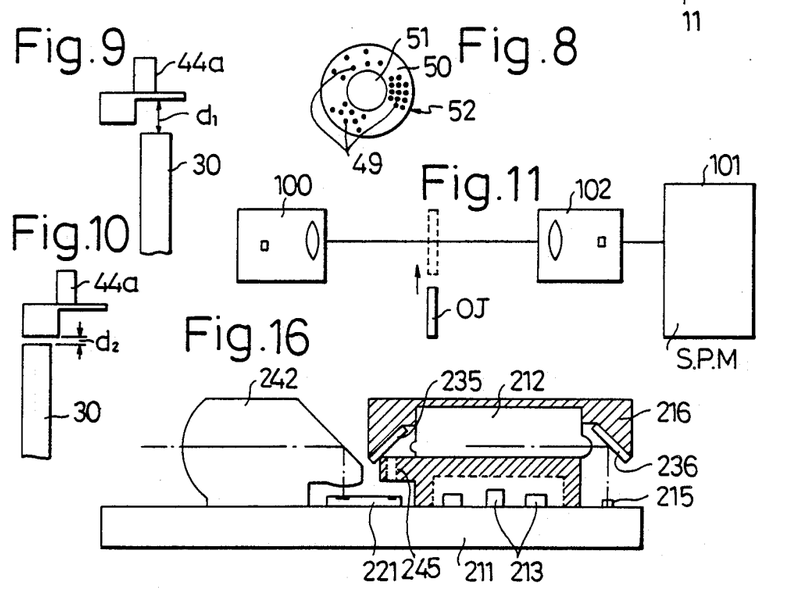
FIG. 8 shows in a plan view a disk member provided with respect to an end of an optical wave guide in the optical sensor of FIG. 1.
FIGS. 9 and 10 are fragmentary schematic views for explaining a mode setting knob shown in another embodiment than that of FIG. 1 and applicable to the optical sensor of the present invention.
FIG. 11 shows in a block diagram another embodiment of the optical sensor according to the present invention.
FIG. 16 shows in a schematic sectioned view still another embodiment of the optical sensor according to the present invention.
Figures 12, 14, 15:
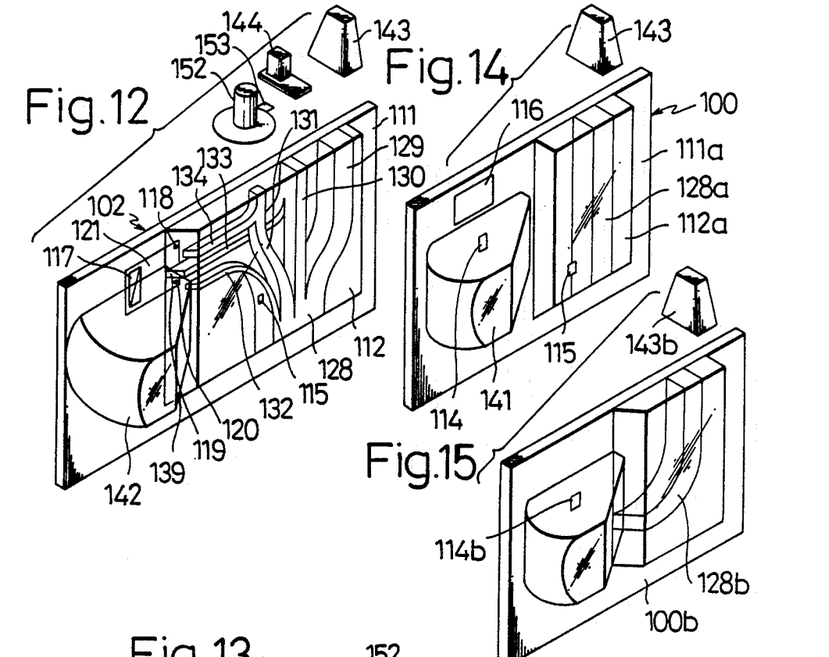
FIG. 12 shows in a perspective view a light receiving side of the optical sensor of FIG. 11.
FIG. 14 is a perspective view on the light projecting side of the optical sensor of FIG. 11.
FIG. 15 is a perspective view in another aspect of the light projecting side applicable to the sensor of FIG. 11.
Figure 13:
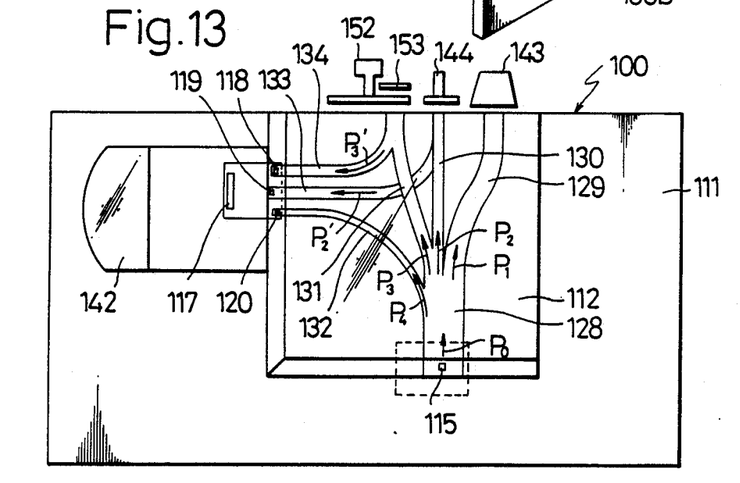
FIG. 13 is a side elevation on the same light receiving side of the optical sensor of FIG. 11.

Third branch light $P_3$ is directed through the optical wave guide 31 to an optical input part of the sensitivity setting member 45 disposed at an end portion of the optical wave guide 31. This member 45 comprises a sensitivity setting knob 52 provided with a disk part 50 perforated to have many small holes 49 of a predetermined distribution of varying density as seen in FIG. 8 and with an operating part 51, and a reflection plate 53 opposed to the end portion of the wave guide 31 with the disk part 50 interposed there between. The small holes 49 in the disk part 50 are distributed in the present instance to gradually increase or decrease in the circumferntial direction, so that the reflection factor of the reflection plate 53 with respect to the third branch light $P_3$ which has passed through the small holes 49 of the disk part 50 will be varied depending on the amount of rotation or angular position of the sensitivity setting knob 52. An optical wave guide 34 is provided with one end thereof opposed to the member 45 so as to be jointly disposed with the branch wave guide 31 passing the third branch light $P_3$ in the thickness direction of the wiring board 12 and the other end thereof extends away therefrom also in the sideward direction to terminate at a mirror portion 37. Accordingly a modulated light $P_3'$ responsive to the angular position of the sensitivity setting member 45 will propagate through the optical wave guide 34 to be reflected at the mirror portion 37 and be received by the light receiving element 18 opposing the other end of the wave guide 34, as seen in FIG. 5.

Fourth branch light $P_4$ propagates through the optical wave guide 32 to be reflected by the mirror portion 38 at an end portion thereof and be received by the light receiving element 20 opposing this wave guide 32.

Instead of such provision of the output mode setting member 44 as in the above, it may be possible to provide an output mode setting member 44a which is provided with a stepped portion as shown in FIGS. 9 and 10, so that the member 44a will have different distances $d_1$ and $d_2$ to the end portion of the wave guide 30 depending on the displaced position of the member 44a, the distance $d_1$ being relatively larger as seen in FIG. 9 to render the modulation level to be lower while the distance $d_2$ being relatively smaller as in FIG. 10 to elevate the modulation level. The disk part 50 of the sensitivity setting member 45 may have a shape other than a true circle such as a non-circular configuration that will form an involute curve so that opposing area between the disk part 50 and the end portion of the wave guide 31 or 34 will be varied as the setting member 45 is rotated, whereby the sensitivity variation can be realized without perforating the disk part.

A light from the light emitting element 14, on the other hand, is reflected on the mirror portion 39 so as to be collimated at the light projecting lens part 41 and irradiated out of the wiring board 12 as a light beam. Any reflected light of the beam back from any object present in a detection area is condensed at the light receiving lens portion 42 and is reflected at the mirror portion 40 so as to be incident upon the light receiving element 17 as seen in FIG. 7.

An assembling operation for making the optical sensor 10 in the foregoing embodiment shall be briefly referred to. First, the electronic circuit parts 13 such as the transistors, capacitors, resistors and the like, the auxiliary printed circuit board 16 including the light emitting elements 14 and 15 and the IC chip 20 of the light receiving elements 17 and 18–20 are mounted to a front side surface having the conductor pattern of the printed circuit substrate 11. Onto the other reverse surface of the substrate, the optical interconnection board 12 including the optical wave guides 28–34, mirror portions 35–40 and lens portions 41 and 42 are mounted while being positioned by means of the through holes 22 to 27, and the substrate 11 is inserted into a casing (not shown) in which the indicating member 43, output mode setting member 44 and sensitivity setting member 45 are disposed for the foregoing operations thereof, and the board 12 is secured in the casing. With this arrangement, it is made possible that the light emitting elements 14 and 15 coupled to the electronic circuit parts 13 through the optical wave guides 28–34, mirror portions 35–40 and through holes, are optically interconnected with the light receiving elements 17 and 18–20. According to this interconnection arrangement, the component parts of the sensor can be assembled only through the positioning steps for the optical coupling, without involving any electric, mechanical and even optical connecting steps, whereby the required number of parts can be reduced to a large extent, the sensor can be remarkably improved with respect to ease of assembling, a sufficient reduction of required costs can be well achieved and the arrangement even contributes to a minimization in size of the sensor.

In the optical sensor 10 of the foregoing arrangement, further, it should be readily appreciated that the object in the detecting area can be detected in accordance with the received light output of the light receiving element 17, the detection can be modified in the mode by properly processing at a signal processor the output signal of the light receiving element 19 which receives light through the optical wave guide 33 for the modulated light $P_2'$, mirror portion 36 and hole 26, and a proper sensitivity setting voltage can be generated through a comparison of the output from the light receiving element 18 which receives light through the wave guide 34 for the modulated light $P_3'$, mirror portion 37 and hole 25 with the output of the light receiving element 20 which receives light through the wave guide 32 for the branch light $P_4$, mirror portion 38 and hole 27.

Referring next to FIGS. 11 to 14, there is shown another embodiment of the optical sensor according to the present invention, in which substantially the same members as those in the foregoing embodiment are shown with the same reference numerals increased by 100. In the present embodiment, a light projecting means 100 and a light receiving means 102 connected to a signal processing means P.S.M. 101 are so as to oppose each other. In the present embodiment, in contrast to the foregoing embodiment of FIGS. 1–10, the light projecting means 100 is provided as separated from the light receiving means 102 and, except for the removal of a light projecting system, the light receiving means 102 is substantially of the same arrangement as that in the foregoing optical sensor 10. The light projecting means 100 comprises, on the other hand, a printed circuit substrate 111a to which light emitting elements 114 and 115 and IC chip 116 are mounted, and an optical interconnection board 112a including a light projecting lens 141 and optical wave guide 128a, the board 112a being attached to the substrate 111a, so that a light projection from the light emitting element 115 will propagate through the wave guide 128a to be incident upon an operation indicating member 143. The light projected from the light emitting element 114 in the light projecting means 100 is irradiated through the light projecting lens 141 towards the opposing light receiving means 102, the presence of an object OJ between both means 100 and in 102 is thereby detected, and energizing state of the light projecting means 100 is indicated with the operation indicating member 143. It is also possible to have, as shown in FIG. 15, a light receiving means 100b provided only with a single light emitting element 114b for light projection by this element 114b, so that the projected light of the element 114b will propagate through an optical wave guide 128b formed so as to extend between the light emitting element 114b and the operation indicating member 143b, for realizing the operation indication function of the member 143b.

According to another feature of the present invention, the circuit forming members and optical interconnection board are mounted onto the same side of the printed circuit substrate, specifically onto the side having the conductor pattern, in contrast to the foregoing embodiments in which the circuit forming members are mounted to one side while the optical interconnection board is mounted to the other side of the substrate. Referring to FIG. 16, for example, a printed circuit substrate 211 carries on one side having the conductor pattern respective electronic circuit parts 213, and an IC chip 221 including therein an array of light receiving elements as well as a light emitting element 215 are mounted on the same side of the substrate. In addition to a light receiving lens 242, an optical interconnection board 212 including mirror portions 235 and 236 secured through a spacer 216 to the board is also provided on the same side of the substrate 211. As required, an optimum throttle 245 may be disposed between the light emitting elements and the mirror portions. In the present embodiment of FIG. 16, the respective components referred to are formed so as to be slightly different from corresponding components of the foregoing embodiments of FIGS. 1 to 10 or FIGS. 11 to 15, but it should of course be possible to dispose equally formed components to those of the foregoing embodiments concentrated on one side of the printed circuit substrate for achievement of substantially the same operation. According to the present embodiment, as will be readily appreciated, there can be attained a further improvement particularly in the ease of the assembly operation.

Figures 17, 18, 20:
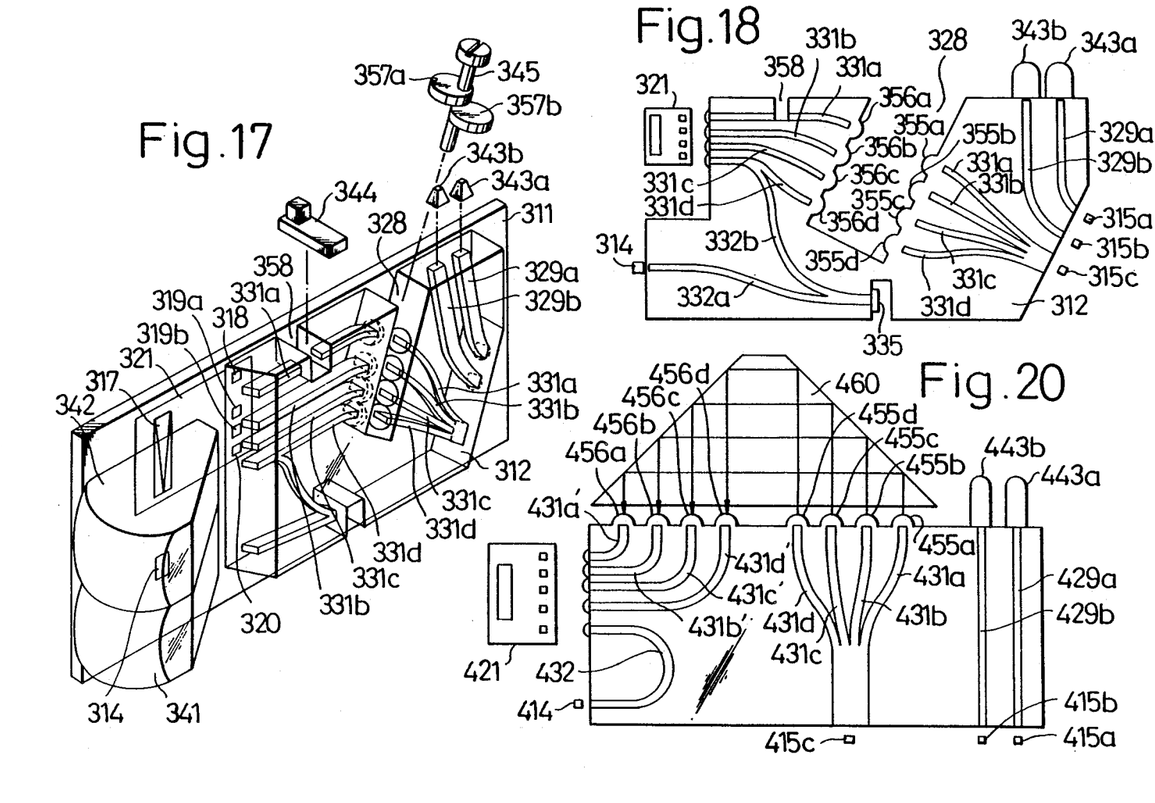
FIG. 17 is a perspective view of a further embodiment of the optical sensor according to the present invention, with a portion shown as disassembled.
FIG. 18 shows in a schematic side view the optical sensor of FIG. 17.
FIG. 20 is a schematic side view of a further embodiment of the optical sensor according to the present invention.

According to still another feature of the present invention, the branched wave guides in the optical interconnection board are discontinuous, and means for adjusting the amount of light propagating through the optical wave guides is provided in a space where the wave guides are discontinuous. Referring now to FIGS. 17 and 18, there are formed in an optical interconnection board 312 of a further embodiment a pair of indicating optical wave guides 329a and 329b for propagation of emitted light from light emitting elements 315a and 315b, branching optical wave guides 331a to 331d for divided propagation of an emitted light from a light emitting element 315c, and a pair of optical wave guides 332a and 332b for propagation initially through the guide 332a and 332b for propagation initially through the guide 332a of light from a light emitting element 314 and then through the guide 332b after the light from the element 314 is reflected back from a mirror portion 335, the reflected light being further propagated as a reference light to one 331d of the branching wave guides. A recess 328 is formed in the optical interconnection board 312 so as to separate intermediate parts of the branching optical wave guides 331a to 331d, and opposing side faces of the recess 328 are formed so as to be bulged (convex) at portions opposing respective free ends of the branching wave guides 331a to 331d, so as to form collimating lenses 355a–355d on one side of the recess and condensing lenses 356a–356d on the other side of the recess 328 for rendering the light propagated through the wave guides 331a–331d to be substantially parallel light beams in the recess 328. A light intensity varying member 345 is disposed in the recess 328, and this member 345 comprises a pair of light shielding elliptical disks 357a and 357b which are secured eccentrically to a rotary shaft to project therefrom in opposite directions so that, as the member 345 is inserted in the recess 328, the disks 357a and 357b will oppose two centrally positioned ones 331b and 331c of the branching optical waves guides 331a–331d and, as the member is rotated about the axis of the shaft, the amount of light propagating through the two optical wave guides 331b and 331c will be caused to vary by the eccentricity of the disks 357a and 357b.

A notch 358 is further made in a upper side of the board 312 so as to again cut off another part of one 331a of the branching optical wave guides, and an output mode setting member 344 is inserted in the notch 358 so as to be shiftable therein, while operation indicating members 343a and 343b are disposed so as to oppose respective of the indicating optical wave guides 329a and 329b. Light projecting lens 341 and light receiving lens 342 of the same structure as in the foregoing embodiments are provided on the substrate 311, and an IC chip 321 including light receiving elements 317, 318, 319a, 319b and 320 and of the same arrangement as in the foregoing embodiments except for an adjustment in number to correspond to the number of the branching wave guides is also mounted to the substrate 311.

In the present embodiment, the presence of an object in the detection area causes a signal processing circuit to be actuated to energize the operation-indicating light emitting element 315a for propagation of light therefrom to the operation indicating member 343a which is thereby operated to indicate the detection, whereas an energization of the light emitting element 315b upon approach of the object to the detection area causes the other operation indicating member 343b to be actuated to indicate the approaching object. By shifting the output mode setting member 344 within the notch 358, on the other hand, the amount of light amount in the first optical wave guide 331a (in which the light from the light emitting element 315c performs substantially the same action as the element 15 in the FIGS. 1–10 embodiment) is made to vary, and the detection mode can be changed over. With a rotary displacement of the light intensity varying member 345 in the recess 328, the amount of light propagated from the light emitting element 315c to the two branching optical wave guides 331b and 331c can be varied, and the same adjusting operation as in the foregoing optical sensor 10 for the optical wave guide can be realized with respect to a plurality of the wave guides 331b and 331c. The provision of the optical wave guides 332a and 332b as associated with the light emitting element 314 and with the branching optical wave guide 331d makes it possible to effectively adjust any fluctuation caused to arise in the optical output of the light emitting element 314, since both the optical input from the light emitting element 314 and that from the light emitting element 315c are obtained.

Figures 19A, 19E:
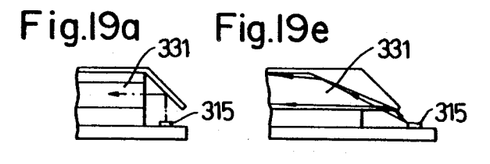
FIGS. 19(a), 19(b), 19(c), 19(d), 19(e), 19(f), 19(g), and 19(h) are fragmentary diagrams for explaining respective aspects of the optical interconnection in the optical sensor of FIG. 17.
Figures 19B, 19F:
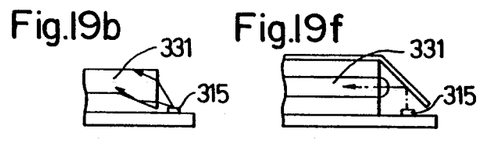
Figures 19C, 19G:
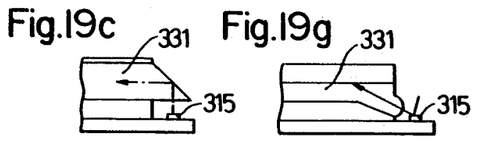
Figures 19D, 19H:
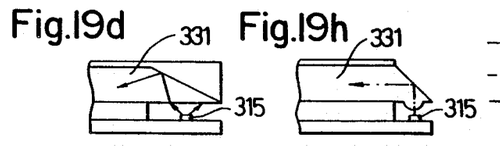

In the present embodiment, the optical coupling between the respective light emitting elements 315a–315b and the branching optical wave guides 331a–331d may be achieved by any one of the various arrangements shown in FIGS. 19(a) to 19(h), in which FIG. 19(a) shows that the light from the element 315 is made to reflect at a mirror portion so as to be incident upon an end edge surface of the wave guide 331; FIG. 19(b) shows that the light is made to be directly incident onto the wave guide 331; FIG. 19(c) shows that the light is directly incident to an end mirror portion on an inclined surface of the wave guide 331 to propagate therethrough; FIGS. 19(d) and 19(e) show that the light is directly incident to an end prism portion at an end surface of the wave guide 331 to propagate therethrough;

and FIGS. 19(f), 19(g) and 19(h) show that the light is made to be incident to a condensing lens provided on the end surface of the wave guide 331.

Figure 19I:
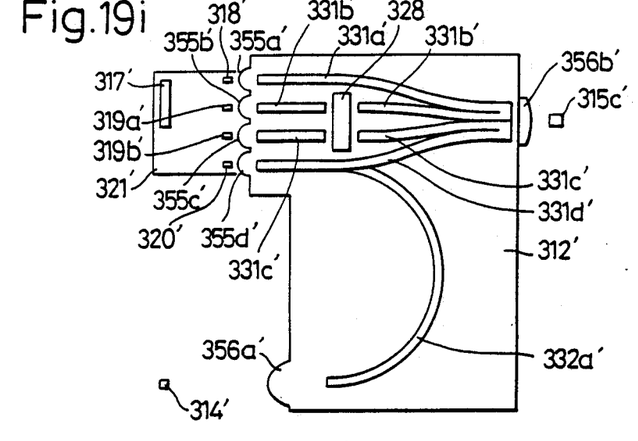
FIG. 19(i) is a fragmentary side view thereof.

In FIG. 19(i), there is shown a further optimum embodiment in which a plurality of discontinuous branching optical wave guides are separated by a space, in which means for adjusting the amount of light propagated through the wave guides is also disposed in the space provided by the discontinuity. An optical interconnection board 312' of this embodiment is formed to have four branching optical wave guides 331a'-331d' for dividing and propagating therethrough the light projected from a light emitting element 315c', and a further optical wave guide 332a' for propagating therethrough a light input from a light emitting element 314' for light-projection and providing this light input as a reference light to one 331d' of the branching optical wave guides. In this optical interconnection board 312', there is provided an aperture 328' which cuts off intermediate portions of two 331b' and 331c' of the branching optical wave guides, the two being positioned towards the middle of the four, and condensing lenses 356a' and 356b' are provided as bulging outwardly opposite edge portions of the board 312' towards the light emitting elements 314' and 315c'. Further, at positions on a side edge of the board 312' where end edges of the branching optical wave guides 331a' and 331b' are located and where light receiving elements 317', 318', 319a', 319b' and 320' of an IC chip 321' are optically coupled, there are provided collimating lenses 355a'-355d' which bulge outwardly. It should be appreciated that, while the drawing does not specifically show such features as an operation indicating wave guide, light projecting and receiving lens portions as in the foregoing embodiments, such features can be similarly provided.

Figure 19J:
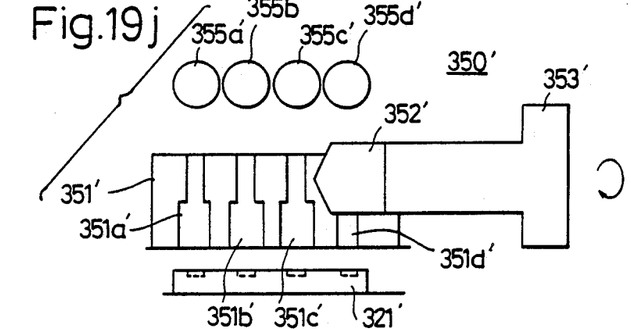
FIG. 19(j) is a schematic diagram showing a light amount adjusting means employed in the sensor of FIG. 19(i)
Figure 19K:
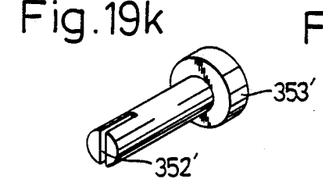
FIG. 19(k) shows in a perspective view a light shielding knob in the adjusting means of FIG. 19(j)
Figure 19L:
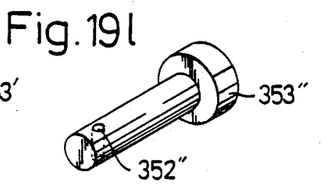
FIG. 19(l) shows also in a perspective view another aspect of the light shielding knob.

Between the collimating lenses 355a'-355d' of the optical interconnection board 312' and the light receiving elements 318'-320' of the IC chip 321', there is disposed a light intensity throttling means 350' such as shown in FIGS. 19(j) and 19(k), and this throttling means 350' comprises a throttle plate 351' having four throttling portions 351a'-351d' which are aligned with the collimating lenses 355a'-355d', and a light shielding knob 353' mounted to a housing (not shown) so as to be shiftable as rotated and having a slit 352' which can come into matching relation as the knob is caused to shift to one or more of the throttling portions 351a'-351d' or out of the matching relation. In the present instance, the slit 352' of the knob 353' may be replaced by a through hole 352" such as in a light shielding knob 353" of FIG. 19(l).

Figures 21, 22, 23, 24:
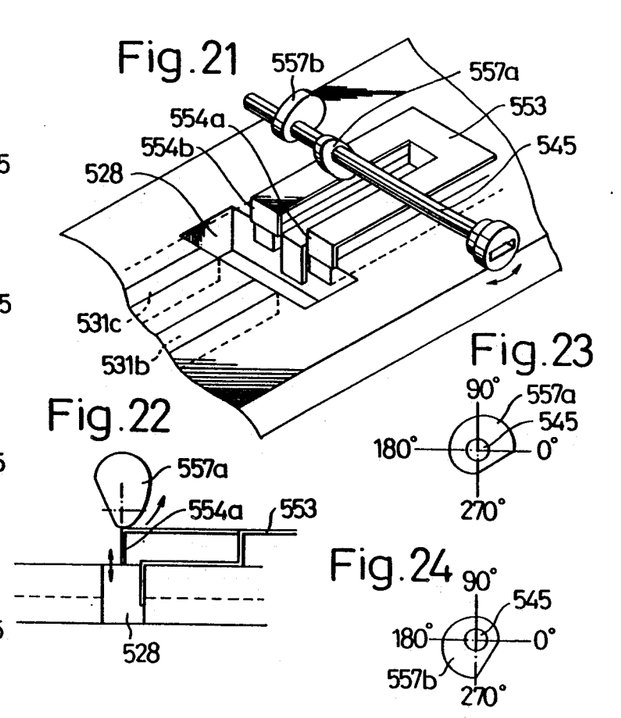
FIG. 21 is a fragmentary perspective view of an optical volume mechanism applied to the optical sensor of the present invention.
FIGS. 22, 23, and 24 are explanatory views of the volume mechanism of FIG. 21.

In the optical sensor of this embodiment, too, substantially the same light projection and reception with respect to the detection area are performed by the light projecting means including the light emitting element 314' as well as the light receiving means as in the foregoing embodiments, while a projected light from the light emitting element 315c' is made incident through a proper mirror portion to the branching optical wave guides 331a'-331d' as an input light, output light from the collimating lenses 355a'-355d' will be led through the throttling means 350' to an optimum mirror portion to be thereby refracted to be incident upon the light receiving elements 318'-320', and the same operation as in the foregoing embodiments can be realized. In the present case, a light intensity varying member is disposed in the aperture 328' for shifting operation to modulate propagated light through the two branching optical wave guides 331b' and 331c'. For the light intensity varying member, one such as will be described later with reference to FIG. 21 or 26 may be employed. In common to the arrangement of FIG. 16, the optical interconnection board as well as the circuit parts thereof of the present embodiment may be mounted onto the same side having the conductor pattern of the printed circuit substrate, as in the embodiment of FIGS. 17-19. This concentrated mounting on the same side is extremely advantageous and may be employed also in another embodiment referred to in the following with reference to FIG. 20.

In FIG. 20, still another embodiment of the optical sensor according to the present invention shows optical coupling of branching optical wave guides 431a to 431d to corresponding wave guides 431a' to 431d' through a prism member 460, so that the light projected out of collimating lenses 455a to 455d at end edges of the wave guides 431a to 431d will be reflected twice within the prism member 460 to be incident on condensing lenses 456a to 456d at end edges of the corresponding branching wave guides 431a' to 431d'. In this case, the sensitivity adjustment can be realized by inserting a perforated rotary disk such as shown in FIG. 8 between the respective collimating lenses 455a to 455d and the prism member 460. Other modifications and operation of this embodiment are the same as those in the foregoing embodiments.

Referring next to FIGS. 21 to 24, there is shown another light intensity varying arrangement employable in the optical sensor according to the present invention, in which a light intensity varying member 545 comprises a pair of eccentric cams 557a and 557b which are secured onto an axially rotatable shaft so as to be axially separated from each other and extend radially from the shaft so as to have a phase difference at a mechanical angle of 90 degrees, and the eccentric cams 557a and 557b are disposed to oppose a notch 528 formed so as to partly cut off two branching optical wave guides 531b and 531c in an optical interconnection board 512. A forked and elastic light shielding plate 553 having respective flaps 554a, 544b extending from deflectable forked ends thereof is disposed between the member 545 and the board 512 so that the forked ends of the light shielding plate 553 will be urged by the eccentric cams 557a and 557b to alternately insert each of the pair of flaps 554a and 554b into the notch so as to be disposed of the cut off part of the wave guide 531b or 531c. In response to the rotation of the light intensity varying member 545, therefore, the flaps 554a and 554b are caused by the eccentric cams 557a and 557b to move into and out of the notch 528 and, responsive to the degree of the insertion, the amount of the light propagation in the wave guides 531b and 531c can be varied as shown by curves in FIG. 25 in which the light intensity D in the wave guides 531b 531c is taken on the ordinate and the rotary angle of the member 545 is taken on the abscissa.

Figures 25, 26, 27, 28, 29:
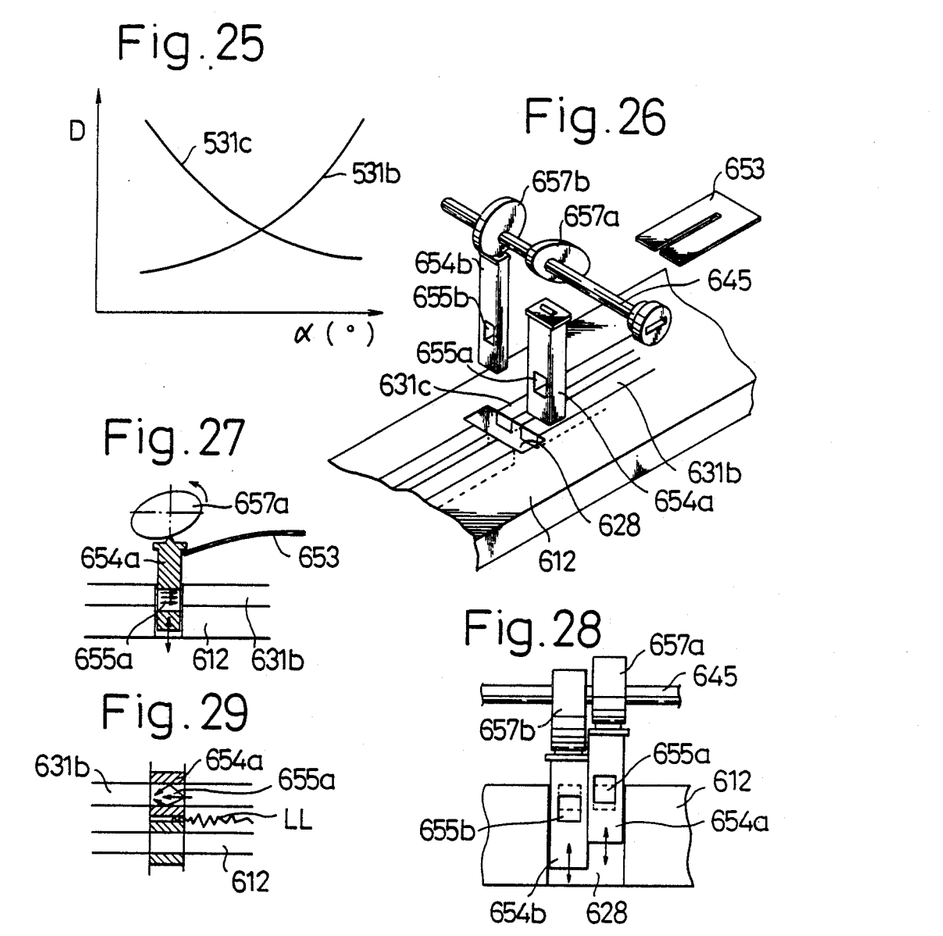
FIG. 25 is a diagram showing the relationship between cam's rotary angle and controlled light amount in the volume mechanism of FIG. 21.
FIG. 26 is a fragmentary perspective view of another embodiment of the optical volume mechanism applicable to the optical sensor of the present invention.
FIGS. 27, 28, and 29 are explanatory views for the operation of the optical volume mechanism of FIG. 26.

In FIGS. 26 to 29, there is shown yet another light intensity varying arrangement. In this embodiment, a light intensity varying member 645 also comprises a pair of eccentric cams 657a and 657b secured to an axially extending rotatable shaft so as to be axially separated from each other and extend radially from the shaft so as to have a mechanical phase difference, a notch 628 is provided in an optical interconnection board 612 to partly cut off two optical wave guides 631b and 631c formed in the board 612, a forked spring plate 653 is secured above the board 612 to dispose its two forked free ends between the notch 628 and the eccentric cams 657a and 657b disposed to oppose the notch 628, and a pair of light shielding members 654a and 654b and supported by the free ends of the plate 653 so as to be caused by the rotated cams 657a and 657b to shift into and out of the notch 628. In proper positions of the light shielding members 654a and 654b, through holes 655a 655b are provided so that the through holes 655a and 655b will move reciprocatingly in the notch 628 with the shifting light shielding members 654a and 654b, the light propagation through the wave guides 631b and 631c being shielded by other portions of the members 654a and 654b than the through holes 655a and 655b, so as to properly vary the amount of light propagated. When these light shielding members 654a and 654b are disposed so as to be slidable along but intimately engage with peripheral walls of th enotch 628, light is allowed to pass only through the holes 655a and 655b to propagate through the wave guides and, as shown in FIG. 28, the sensor can be prevented from being influenced by leakage LL of light from any other parts of the device as shown in FIG. 29.

Figures 30, 31, 32A, 32B, 32C, 34, 35, 36, 37, 38, 39:
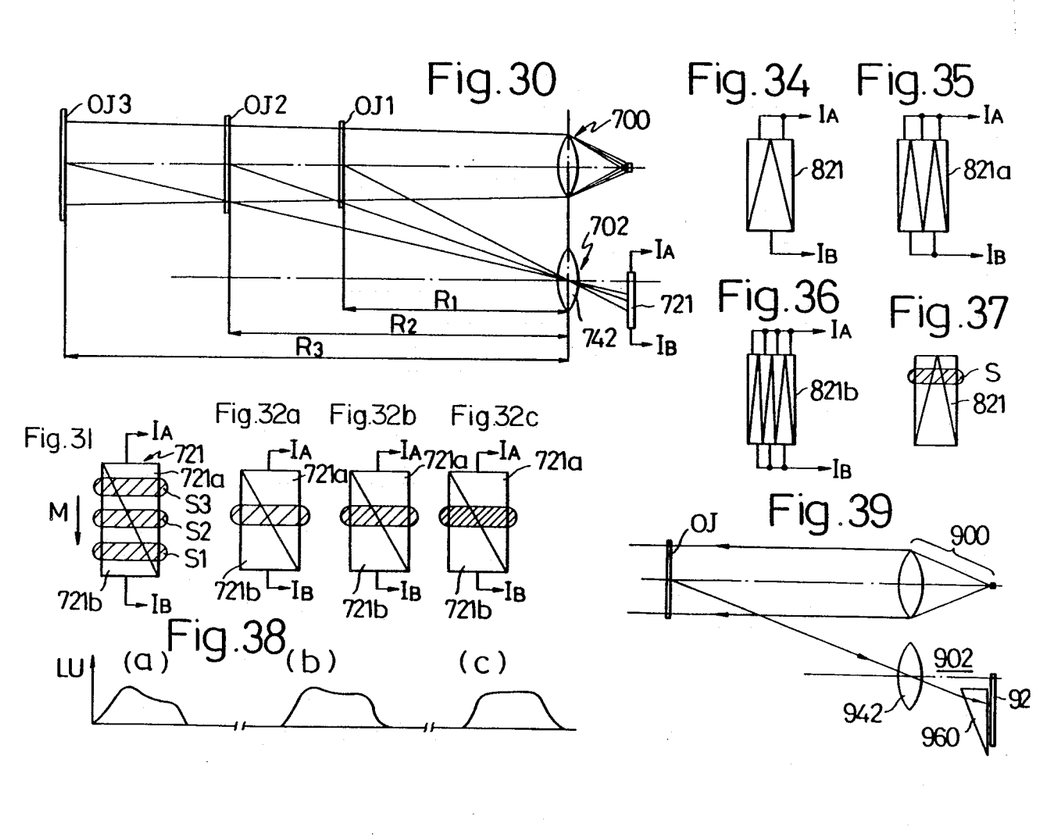
FIG. 30 is an explanatory diagram in still another embodiment employing an anamorphic lens of the optical sensor according to the present invention.
FIGS. 31, 32(a), 32(b), 32(c), and 33 are explanatory views for the operation of the optical sensor of FIG. 30.
FIGS. 34, 35, and 36 are explanatory views for further embodiments of the optical sensor according to the present invention in respective which the anamorphic lens is employed.
FIGS. 37, 38, and 39 are explanatory views for the operation of the optical sensor of FIG. 34.

According to still another feature of the present invention, there is employed in the light receiving means a light receiving lens which comprises an anamorphic lens which expands a condensed light spot provided to a position detecting element for detecting the position in a detection area of an object in response to a reflected light therefrom, the expansion being made in a direction perpendicular with respect to the direction of travel of the condensed light spot. Referring now to FIGS. 30 and 31, a light receiving means 702 provided as properly spaced from a light projecting means 700 comprises a light receiving anamorphic lens 742, while a position detecting means 721 is disposed behind the lens 742. The position detecting means 721 comprises a pair of photodiodes 721a and 721b, adjoining line AL which is disposed so as to be diagonal with respect to a straight line extending in a moving direction denoted by an arrow M of the condensed spot S of light which has passed through the light receiving lens 742.

Figure 33:
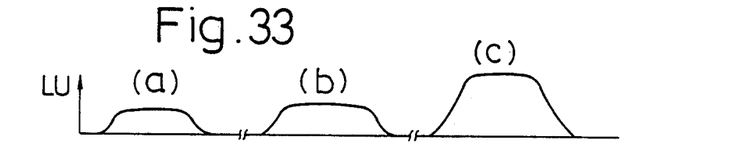

In this arrangement, light is projected from the light projecting means 700, and a reflected light back from an object OJ1, OJ2 or OJ3 in a detection area at a distance $R_1$, $R_2$ or $R_3$ from the projecting means 700 is condensed as it passes through the anamorphic light receiving lens 742 to form a condensed light spot S1, S2, or S3 on the position detecting means 721, on which each condensed spot takes a position correpsonding to the distance of the object as seen in FIG. 30, and the position detecting means 721 provides an output current in which the ratio $I_A/I_B$ of outputs of both photodiodes 721a and 721b varies depending on the position of the condensed light spot. That is, the distance of the object can be obtained on the basis of the ratio $I_A/I_B$ of the output current. Here, the condensed light spots S1–S3 are respectively expanded to be linear in the direction perpendicular to the moving direction M of the spot responsive to the distance of the object, as seen in FIG. 31, whereby the distribution of the intensity of illumination by the linear condensed light spot on the detecting means 721 is made substantially always constant even when the object OJ moves to traverse the detection area in a direction vertical to the plane of FIG. 30 or, in particular, when the object is present at a position which deviates from the optical axis of the light from the light projecting means 700 vertically with respect to the plane of the drawing, as will be seen in FIGS. 32(a) to 32(c), as well as in FIGS. 33(a) to 33(c). In other words, the detection of the object traversing the optical axis in a vertical direction with respect to the plane of the drawing results in variation in the intensity of illumination LU such as in curves of FIG. 33 but in such constant illumination distribution, so that the ratio $I_A/I_B$ of detected position signals $I_A$ and $I_B$ provided by the photodiodes 721a and 721b will not vary and accurate position and distance signals can be always obtained.

It is also advantageous to employ position detecting means 821, 821a and 821b such as shown in FIGS. 34 to 36, in which the means comprise three or more of the photodiodes adjoined. When, for example, the position detecting means 821 comprises three photodiodes as in FIG. 34 and the condensed light spot S is provided closer to a longitudianl end of the means 821 as in FIG. 37, the distribution of illumination LU of the linear condensed light spot is made by the anamorphic lens to be substantially constant over the entire detecting means 821 but is unable to be made completely constant. Provided that the object OJ in the detection area moves to traverse the optical axis in the vertical direction with respect to the plane of the drawings, the level of illumination LU will be as shown in FIGS. 38(a) to 38(c) in which, in particular, the state shown in FIG. 38(a) shows that the output of the left side end photodiode rises to be higher so as not to be able to obtain accurate $I_A/I_B$ information. In this case, as shown in FIGS. 34 to 36 in which a plurality of sharply angled triangular photodiodes are interengaged with each other in the longitudinal direction of the means 821, 821a and 821b, i.e., in the moving direction M of the condensed light spot, because the photodiodes in each means are so arranged that one output signal $I_A$ is obtained from a group of photodiodes including ones which are disposed on both widthwise sides while the other output signal $I_B$ is obtained from the other photodiode or the other group of photodiodes disposed inwardly there of, it is made possible that the distance signal $I_A/I_B$ of an object which moves in the direction transverse to the optical axis in the detection area becomes larger than a value accurately corresponding to an actual distance R. That is, the output of the position detecting means 821 is discriminated at a signal processing means to correspond to a distance larger than the actual distance. However, it is possible to reliably prevent from occurring any erroneous operation that may occur upon an uneven signal generation such as in FIG. 38(a) with respect to an object which only starts moving to traverse the detection area rather than moves in a direction of approaching the light receiving means. Furthermore, in operating the position detection, it will be possible to employ an operating means such as has been disclosed in U.S. Pat. No. 4,633,077 (or German Patent No. 3,407,210 or Italian Patent Application No. 47757-A/84) of an earlier invention of the same assignee as in the present case.

FIG. 39 shows another optical sensor in which a light receiving means 902 comprises an anamorphic light receiving lens 942, a position detecting means 921 and a prism 960 disposed between the lens 942 and the means 921 so as to be shiftable along the means 921 for adjusting the set distance of the detection area. With this arrangement, the position of the condensed light spot on the position detecting means can be varied and, in combination with the same type of the position detecting means as in the above, a similar erroneous operation can be effectively prevented. With the arrangement, further, it is possible to remarkably simplify the required arrangement for setting the detection area, to achieve improvements in the ease of assembling and mass-producibility, and to elevate the reliability with reduced possibility of erroneous operation.

While the present invention has been explained with reference to the foregoing embodiments shown in the accompanying drawings, it should be appreciated that the invention is not limited to only these embodiments shown but rather, includes all modifications, alterations and equivalent arrangements possible within the scope of the appended claims.

What we claim as our invention is:

1. An optical sensor comprising means for projecting light to a detection area, means for receiving light reflected from an object present in said detection area, sensor function setting means capable of energizing said light projecting means, and signal processing means for processing an output signal from said light receiving means to discriminate the presence of said object and for providing an object detection signal, said light receiving means including light receiving lens means for forming a linear condensed light spot which extends in a direction perpendicular to a direction of movement of the light spot in accordance with changes in a distance between the sensor and an object in the detection area, said light receiving means including position detecting means which comprises at least three photodiodes, two of the three photodiodes outputting a first position signal and a third of the three photodiodes outputting a second position signal, said lens means forming said condensed light spot such that said light spot is simultaneously received on said three photodiodes which output the first and second position signals indicative of a distance between the object and said light receiving means.

2. An optical sensor according to claim 1, wherein said position detecting means receives said condensed light spot of said light receiving lens means and provides a pair of position signals $I_A$ and $I_B$, the at least three photodiodes being disposed such that at least two of the photodiodes are positioned on opposite sides of at least another one of the photodiodes which is positioned therebetween, said signal $I_A$ being obtained from said at least two photodiodes, and said signal $I_B$ being obtained from said at least another one of the photodiodes.

3. An optical sensor according to claim 2, wherein said position detecting means further comprises prism means movably mounted along the position detecting means for modifying a position of said condensed light spot on the photodiodes and adjusting a set object detection distance.

4. An optical sensor according to claim 1, wherein said photodiodes extend in a longitudinal direction parallel to a direction in which the condensed light spot moves over the photodiodes in accordance with changes in the distance between the object and the light receiving means, the lens means comprising an anamorphic lens which expands the condensed light spot in a transverse direction which is perpendicular to said longitudinal direction.

5. An optical sensor according to claim 4, wherein at least one of said photodiodes has a width in said transverse direction which increases from one end to an opposite end of said position detecting means in said longitudinal direction and at least two of said photodiodes each having a width in said transverse direction which decreases from said one end to said opposite end of said position detecting means.

6. An optical sensor according to claim 1, wherein a first plurality of said photodiodes comprise a first group of photodiodes and a second plurality of said photodiodes comprise a second group of said photodiodes, said first group of the photodiodes outputting said first position signal and said second group of the photodiodes outputting a second position signal, said lens means forming said condensed light spot simultaneously on said first and second groups of photodiodes which output the first and second position signals indicative of a distance between the object and said light receiving means.

7. An optical sensor according to claim 6, wherein said first and second groups of photodiodes extend in a longitudinal direction parallel to a direction in which the condensed light spot moves over the photodiodes in accordance with changes in the distance between the object and the light receiving means, the lens means comprising an anamorphic lens which expands the condensed light spot in a transverse direction which is perpendicular to said longitudinal direction.

8. An optical sensor according to claim 7, wherein each photodiode of said first group of photodiodes has a width in said transverse direction which increases from one end to an opposite end of said position detecting means in said longitudinal direction and each photodiode of said second group of photodiodes has a width in said transverse direction which decreases from said one end to said opposite end of said position detecting means.

9. An optical sensor utilizing triangulation, the sensor comprising means for projecting light to a detection area, means for receiving light reflected from an object present in said detection area, sensor function setting means capable of energizing said light projecting means, and means for processing output signals from said light receiving means to provide an object detection signal; said light receiving means including an anamorphic light receiving lens which condenses said reflected light upon said light receiving means mostly in a moving direction of a condensed light spot on the light receiving means upon variation in a distance of the object from the sensor so as to have said condensed light spot expanded in a direction perpendicular to said moving direction, and a position detecting means comprising a plurality of light receiving elements respectively extending in said moving direction of the condensed light spot as adjoined to one another in said expanded direction of the light spot and within the extent of the expanded light spot respectively with an adjoining line lying diagonally with respect to the moving direction of the light spot from one end to another end of the light receiving means in the moving direction of the light spot; wherein said light receiving elements of said position detecting means comprise at least three photodiodes arranged to dispose at least two of said photodiodes on opposite sides of at least a third one of the photodiodes positioned therebetween, the photodiodes providing a pair of position signals $I_A$ and $I_B$ to provide said output signals of the light receiving means as a signal ratio $I_A/I_B$, said signal $I_A$ being obtained from said at least two photodiodes and said signal $I_B$ being obtained from said at least a third one of the photodiodes.

10. An optical sensor according to claim 9, wherein said at least three photodiodes comprise five photodiodes, three of which comprise a first group of photodiodes and two of which comprise a second group of photodiodes, said first group of the photodiodes outputting said position signal $I_A$ and said second group of the photodiodes outputting said position signal $I_B$, the condensed light spot formed by said anamorphic lens being simultaneously received on said first and second groups of photodiodes, each of said first group of photodiodes having a wicth in said transverse direction which increases from one end to an opposite end of said position detecting means in said longitudinal direction and each of said second group of photodiodes having a width in said transverse direction which decreases from said one end to said opposite end of said position detecting means.

11. An optical sensor according to claim 9, wherein said at least three photodiodes comprise seven photodiodes, four of which comprise a first group of photodiodes and three of which comprise a second group of photodiodes, said first group of the photodiodes outputting said position signal $I_A$ and said second group of the photodiodes outputting said position signal $I_B$, said condensed light spot formed by said anamorphic lens being simultaneously received on said first and second groups of photodiodes, each of said first group of photodiodes having a width in said transverse direction which increases from one end to an opposite end of said position detecting means in said longitudinal direction and each of said second group of photodiodes having a width in said transverse direction which decreases from said one end to said opposite end of said position detecting means.

12. An optical sensor according to claim 9, wherein said position detecting means further comprises a prism means movably mounted along the position detecting means for modifying a position of said condensed light spot on the photodiodes and adjusting a set object detection distance.

* * * * *